(12) United States Patent
Patch et al.

(10) Patent No.: US 7,464,331 B2
(45) Date of Patent: Dec. 9, 2008

(54) SYSTEM AND METHOD FOR VALIDATING HIERARCHICALLY-ORGANIZED MESSAGES

(75) Inventors: Raymond Robert Patch, Redmond, WA (US); Mathrubootham Janakiraman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 10/643,031

(22) Filed: Aug. 18, 2003

(65) Prior Publication Data

US 2005/0044093 A1 Feb. 24, 2005

(51) Int. Cl.
*G06F 17/00* (2006.01)

(52) U.S. Cl. ...................... 715/237; 715/234

(58) Field of Classification Search ................ 715/500, 715/509, 513, 514, 526, 200, 217, 234, 237, 715/273
See application file for complete search history.

(56) References Cited

U.S. PATENT DOCUMENTS

| | | | |
|---|---|---|---|
| 6,389,414 B1 | 5/2002 | Delo et al. | 707/4 |
| 6,484,177 B1 | 11/2002 | Van Huben et al. | 707/10 |
| 6,519,617 B1 | 2/2003 | Wanderski et al. | 707/513 |
| 6,584,459 B1 | 6/2003 | Chang et al. | 707/3 |
| 6,667,700 B1* | 12/2003 | McCanne et al. | 341/51 |
| 6,915,454 B1* | 7/2005 | Moore et al. | 714/38 |
| 6,954,766 B2* | 10/2005 | Ouchi | 707/203 |
| 7,003,526 B1* | 2/2006 | Lee et al. | 707/102 |
| 2002/0161745 A1 | 10/2002 | Gainor | |
| 2002/0188890 A1* | 12/2002 | Shupps et al. | 714/38 |
| 2003/0005044 A1* | 1/2003 | Miller et al. | 709/203 |
| 2003/0028863 A1* | 2/2003 | Reichenthal | 717/135 |
| 2003/0061216 A1 | 3/2003 | Moses | |
| 2003/0120875 A1* | 6/2003 | Bourne et al. | 711/144 |
| 2003/0163778 A1* | 8/2003 | Shores et al. | 715/500 |

(Continued)

FOREIGN PATENT DOCUMENTS

WO WO0137170 A2 5/2001

(Continued)

OTHER PUBLICATIONS

Tittel et al., XML for Dummies $2^{nd}$ Edition, copyright 2000, IDG Books Worldwide, Inc., pp. 61-78 and 299.*

(Continued)

*Primary Examiner*—Gregory J. Vaughn
(74) *Attorney, Agent, or Firm*—Woodcock Washburn LLP

(57) ABSTRACT

A mechanism for validating a message, such as an XML message or other hierarchically-organized content. A validation engine walks through the tree represented by the message preferably in depth-first traversal order. Upon encountering each node in the tree, the validation engine consults a validation table to identify a delegate that is to be invoked. The validation engine then invokes the delegate identified for that node, and calls itself recursively on the subtrees of the current node. After the subtrees have been processed, the validation engine again consults the validation table to identify a post-handler for the current node, and then invokes the post-handler. An entry in the validation table may be flagged as "exclusive" to prevent traversal of subtrees of the node corresponding to that entry. Additionally, there may be both global and local validation tables, where the global table is used when a node has no entry in the local table.

24 Claims, 6 Drawing Sheets

U.S. PATENT DOCUMENTS

| | | | |
|---|---|---|---|
| 2003/0182321 A1* | 9/2003 | Ouchi | 707/201 |
| 2004/0030788 A1* | 2/2004 | Cimo et al. | 709/229 |
| 2004/0226027 A1* | 11/2004 | Winter | 719/328 |
| 2004/0268236 A1* | 12/2004 | Chidlovskii et al. | 715/513 |
| 2006/0059107 A1* | 3/2006 | Elmore et al. | 705/64 |

FOREIGN PATENT DOCUMENTS

| WO | WO0239390 A1 | 5/2005 |
|---|---|---|

OTHER PUBLICATIONS

Tittel et al., XML for Dummies 2nd Edition, copyright 2000, IDG Books Worldwide, Inc., p. 14.*

"Schema" definition provided by Internet encyclopedia Wikipedia, pp. 1-2.*

"Semantics" definition provided by Internet encyclopedia Wikipedia, pp. 1-5.*

"Syntax" definition provided by Internet encyclopedia Wikipedia, pp. 1-5.*

Wikipedia.org, "Parsing", accessed from the web on Jun. 2, 2008, pp. 1-5.*

Wikipedia.org, "Tree Traversal", accessed from the web on Jun. 2, 2008, pp. 1-8.*

Wikipedia.org, "Depth-first search", accessed from the web on Jun. 4, 2008, pp. 1-5.*

* cited by examiner

```
<ADDRESS>    ~202
    <STREET = "123 Main Street">    ~204
    <CITYSTATEZIP>    ~206
        <CITY = "Redmond">    ~208
        <STATE = "Washington">    ~210
        <ZIP>    ~212
            <FIVEDIGIT = "98052">    ~214
            <PLUSFOUR = "0123">    ~216
        </ZIP>    ~218
    </CITYSTATEZIP>    ~220
</ADDRESS>    ~222
```

SYSTEM AND METHOD FOR VALIDATING HIERARCHICALLY-ORGANIZED MESSAGES

FIELD OF THE INVENTION

The present invention relates generally to the field of computing, and, more particularly, to systems and methods for message validation.

BACKGROUND OF THE INVENTION

Information is generally represented in a lexicon or language that is sufficiently rich to allow both valid and invalid content to be expressed. For example, it is possible to use the Roman alphabet to write a correct English sentence, but it is also possible to string together English words that do not obey the semantic or syntactic rules of any language, or to string together English letters in a manner that is completely unintelligible. The languages in which computer data is expressed are no exception—i.e., it is possible to write computer data that is not valid according to some set of rules.

In computer systems, much data is expressed in a hierarchical manner, such as in the form of an eXtensible Markup Language (XML) message. An XML message conforms to some schema, which essentially defines the proper syntax of some class of messages. For example, a type of message may be an "address," and the schema for an address may require that an address include a street name, a city, a state, and a zip code. However, even a message that obeys the schema may be invalid for some substantive reason. For example, any combination of data that purports to be a street name, city, state, and zip code would satisfy the schema, but the address may still be invalid if, say, the state element is not the name of one of the United States, or if the zip code specified does not match the city/state combination.

The traditional way to do the validation is through brute force, message-specific code. The validation procedure for each message class would have to be written separately with no way in which to modify the procedure's behavior without modifying the class code itself. The problem with this technique is that any change to the substantive requirements for validation would require a change to the source code. Not only is such a change to the source code cumbersome, but it also may require in some cases that the source code be distributed to the public, so that a consumer of the validation procedure can make custom modifications to the procedure. Such distribution of source code may be undesirable.

In view of the foregoing, there is a need for a system that overcomes the drawbacks of the prior art.

SUMMARY OF THE INVENTION

The present invention provides a mechanism for validating a message. A validation engine walks through the message. For example, in the case of an XML message which can be viewed as a tree data structure, the validation engine may walk through the nodes of the tree in a depth-first traversal order.

When each node is encountered, a table is consulted, which specifies "delegates" to validate the node. A delegate is a named unit of code that can be invoked by the validation engine. The validation engine invokes the delegate that corresponds to the type of node that has been encountered. The validation engine then traverses the subtrees of the current node. As these subtrees are traversed, the tables may be consulted and delegates are invoked in the manner described above. After the subtrees have been traversed, the validation engine consults the table again to determine whether there is a post-handler delegate for the current node. If such a post-handler delegate is specified, then the post-handler is invoked. The delegates evaluate a node under some defined validation standard (e.g., a delegate that validates a city, state, and zip code combination by determining that the combination actually corresponds to a real address in the United States).

Preferably, there is both a global table and a local table. The local table is consulted first to determine whether there is a delegate for the current node. If there is such a delegate, then that delegate is invoked. If no such delegate is named in the local table, then the global table is consulted to determine whether a delegate is named therein. If such a delegate is named in the global table, then the delegate from the global table is invoked. The global table may contain delegates that apply to a broad category of message classes, while the local table may contain delegates that are specific to a particular message class.

Preferably, the tables allow a delegate to be optionally specified as "exclusive." If a delegate is exclusive, then it has exclusive control over validating a node and its subtrees, so the subtrees are not traversed by the validation engine, and the delegates associated with the nodes in the subtrees are not applied by the validation engine. Otherwise, if a delegate is not exclusive, then the subtrees are traversed, and the delegates corresponding to the nodes in the subtrees are applied by the validation engine.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF THE INVENTION

Overview

Data that is used by a computer is typically organized in a hierarchical fashion—e.g., XML data that conforms to some schema. Even if data conforms syntactically to a schema, the data may still be invalid under some set of substantive rules. Traditionally, performing substantive validation of a collection of data (such as a message) requires special purpose code that is designed to validate a particular class of messages. The invention provides a general purpose tool that may be used to validate arbitrary classes of messages, and may be extended to apply an arbitrary set of rules to a message. The mechanisms of the present invention can be used to validate any arbitrary data or message for which the validation parameters and data can be expressed in XML form.

Exemplary Computing Environment

Figure 1:
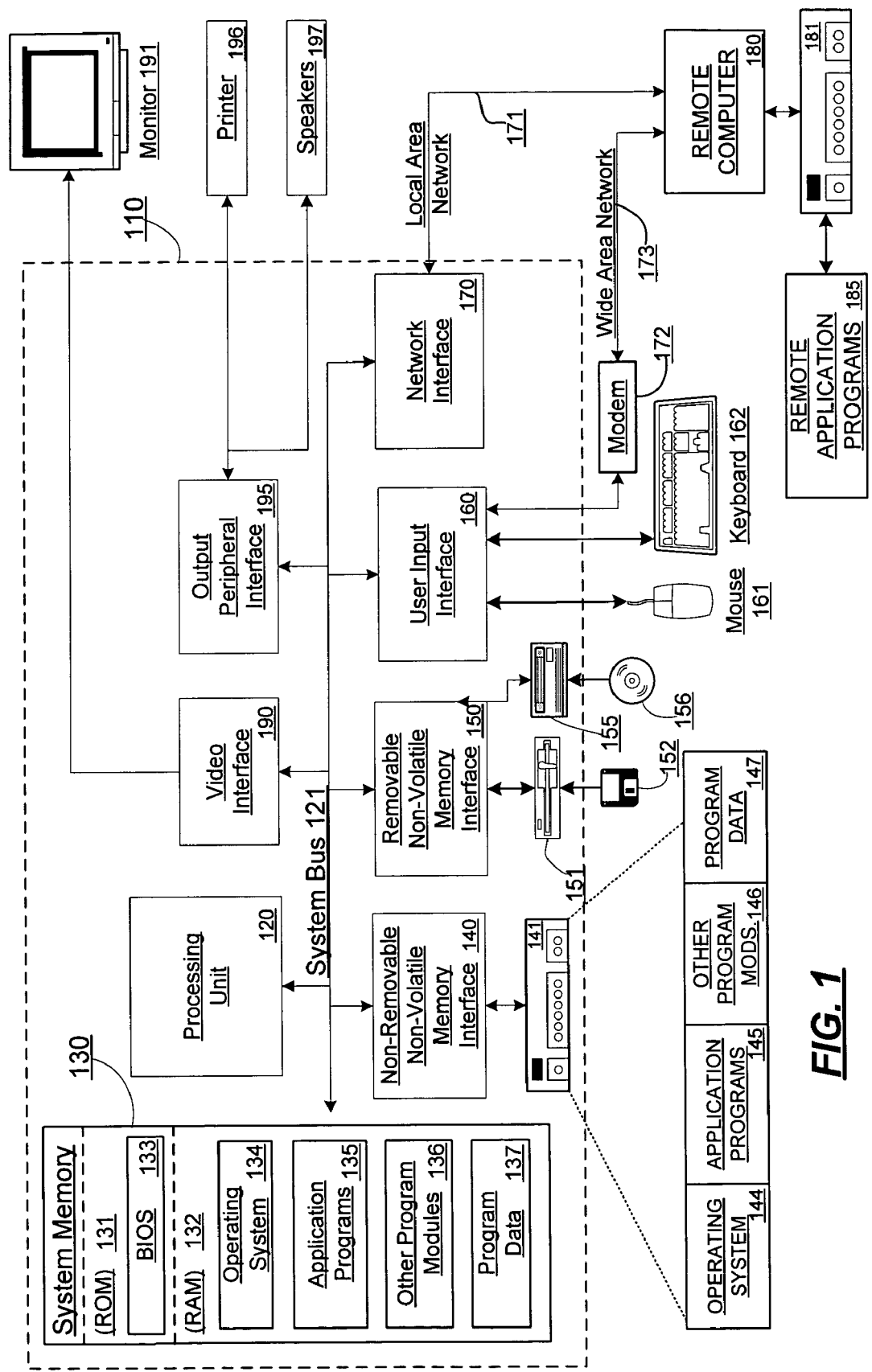
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary XML Data

Figure 2:
FIG. 2 is a block diagram of example message in the form of eXtensible Markup Language (XML)

The present invention may be used to validate a collection of data or "message" that is organized hierarchically, such as data in the form of eXtensible Markup Language (XML). XML is a meta-language that allows data to be organized according to a defined structure or schema. FIG. 2 shows an example of XML data, where the organization depicted may be useful for representing a post-office address.

In XML, data items are associated with element names or "tag" names. The tags may be used as delimiters, using the syntactic convention that the beginning of delimited data is marked by the tag name enclosed in angular brackets "<" and ">", and the end of the delimited data is marked by the tag name preceded by a slash and enclosed in angular brackets. The following is an example of XML data that follows this convention:

<A>

Data that is delimited by tag "A".

</A>

In FIG. 2, message 200 is an address. The delimiters <ADDRESS> (202) and </ADDRESS> (222) enclose the entire message, showing that all of the data is part of the "ADDRESS" element. The ADDRESS element comprises two sub-elements: a STREET element and a CITYSTATEZIP element. The STREET element is set to the value "123 Main Street" (204). The CITYSTATEZIP element is a composite element that includes other elements; these included elements are enclosed in delimiters 206 and 220. The CITYSTATEZIP element includes a CITY element that is set to "Redmond" (208), a STATE element that is set to "Washington" (210), and a ZIP element, which is a composite whose included elements are marked by the delimiters 212 and 218. The ZIP element includes the element FIVEDIGIT, which is set to "98052" (214), and the element PLUSFOUR, which is set to "0123" (216). Thus, message 200 describes an address as a hierarchical collection of data.

Figure 3:
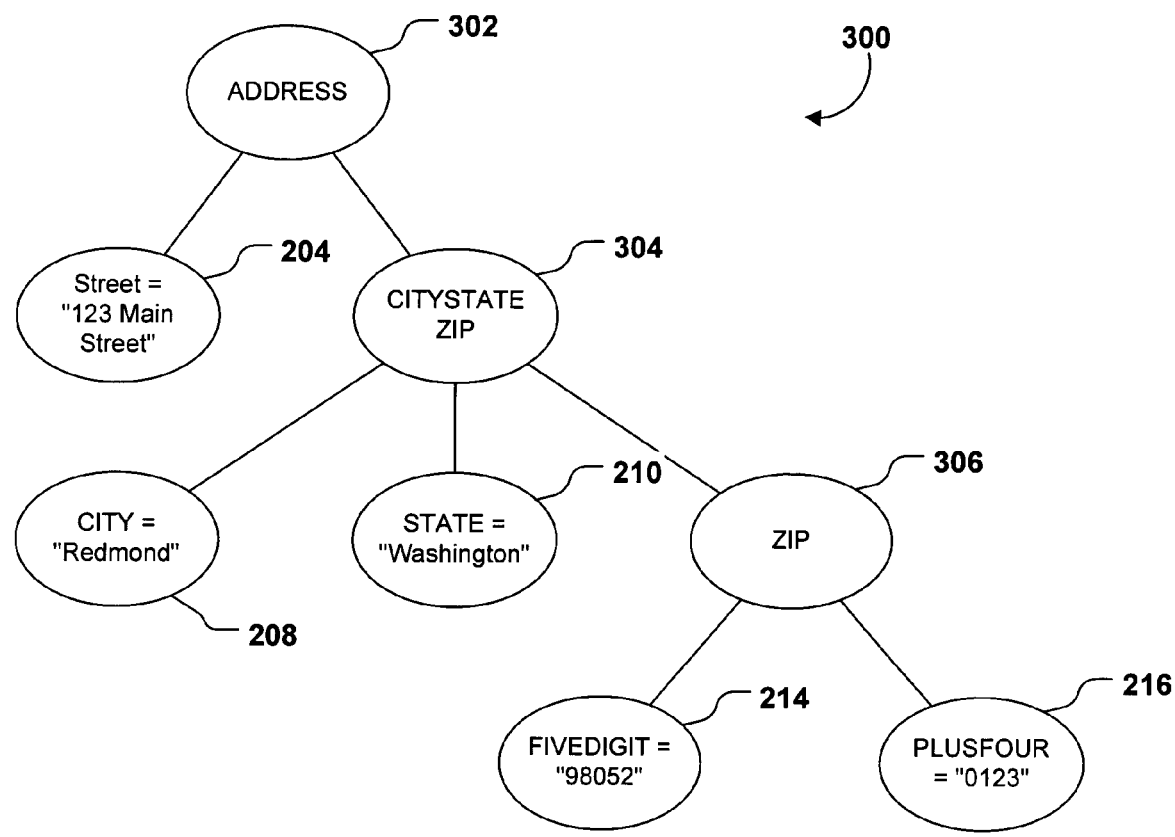
FIG. 3 is a block diagram of a tree representation of the XML message of FIG. 2.

It will be appreciated that an XML message corresponds to a tree data structure. FIG. 3 shows the tree 300 that corresponds to message 200. Node 302 corresponds to the "ADDRESS" tag of FIG. 2; all of the subtrees of node 302 correspond to the elements that are included within the <ADDRESS> and </ADDRESS> delimiters 202 and 222 (shown in FIG. 2). These included elements are the STREET element 204, as well as the CITYSTATEZIP element. As described above, CITYSTATEZIP is a composite that includes other elements. Node 304 corresponds to the CITYSTATEZIP tag, and all of the subtrees of node 304 correspond to the elements that are included within the <CITYSTATEZIP> and </CITYSTATEZIP> delimiters 206 and 220 (shown in FIG. 2). These included elements are the CITY element 208, the STATE element 210, and the ZIP element. The ZIP element, in turn, is a composite that includes other elements. Thus, node 306 corresponds to the ZIP tag, and all of the subtrees of node 306 correspond to the elements that are included within the <ZIP> and </ZIP> delimiters 212 and 218. These included elements are the FIVEDIGIT element 214 and the PLUSFOUR element 216. As can be seen, tree 300 corresponds to the structure in XML message 200, and shows the hierarchical structure of a post-office address contained in message 200.

Messages generally obey some type of predefined structure or "schema." For example, a schema for "address" messages may define the various different types of structures that may be present in an address. For example, such a schema may define an address message as comprising an ADDRESS tag, and may further define the details of the permissible structure of an ADDRESS tag. For example, the schema may state that an ADDRESS tag contains a STREET element, and also one other element which may be CITYSTATEZIP (for United States addresses), or CITYPROVINCEPOSTCODE (for Canadian addresses), or CITYCOUNTRY for addresses outside of the United States or Canada. For each type of element (e.g., CITYSTATEZIP), the schema may define the permissible structure of that element's constituent sub-elements. Under this definition of an ADDRESS tag, it will be understood that the message 200 and its corresponding tree 300, as shown in FIGS. 2 and 3, are merely one example of permissible content for an ADDRESS tag—i.e., the structure for a United States address—and a legitimate ADDRESS could, alternatively, contain one of the other types of elements mentioned above.

In effect, the schema defines the permissible syntax for an XML message. However, it is possible to form an XML message that is syntactically correct under some schema, but violates some rule of substance. The invention provides a mechanism that may be used to validate the substance of an XML message, as more particularly described below.

Tree Traversal

As described above in connection with FIG. 3, an XML message can be regarded as a tree. In accordance with one feature of the invention, the tree represented by an XML message is traversed, preferably in depth-first order. As each node in the tree is encountered, the node is validated in accordance with information provided by one or more validation tables. What it means to "validate" a node—and the structure of the validation tables themselves—is more particularly described below. However, with reference to FIG. 4, an example is described showing what it means to traverse a tree in depth-first order.

Tree 400 comprises a plurality of nodes. The root of tree 400 is labeled "A". The children of the root node are labeled "A1", "A2", and "A3". Each of these children, in turn, has children, which are labeled "A11", "A12", "A21", "A22", "A31", and "A32", as shown in the figure.

When tree 400 is traversed in a depth-first traversal order, each node of the tree is encountered in a particular sequence. The algorithm to traverse a tree in the depth-first sequence can be defined recursively. For a given tree:

First visit the root node of the tree;
Then, visit each of the subtrees of the root node, if any, in left-to-right order, in depth-first sequence.

Since each subtree is, in effect, a tree with its own root node (e.g., A1 is the root node of one of A's subtrees), the algorithm to traverse a subtree in depth-first sequence is the same as the algorithm to traverse the top-level tree in depth-first sequence. Thus, as will be appreciated by those of skill in the art, this traversal algorithm can be implemented as a recursive function.

Thus, when tree 400 is traversed using this recursive algorithm, the first node encountered is root node "A". Then the left-most subtree of root node "A" is traversed in depth-first order. Since each subtree is, in itself, a tree, each of these subtrees has a root node. The root node of A's left-most subtree is labeled "A1." Thus, after node A is visited, the tree-traversal algorithm is applied to the subtree rooted at A1, and the first node visited in this subtree is A1. A1 also has subtrees, and these sub-trees are visited in left-to-right order. Thus, after A1 is visited, the subtree whose root is A11 is traversed in depth-first order. Since A11 has no children, there are no subtrees of A11 to traverse, so the next subtree to the right of A11 (i.e., the tree rooted at A12) is traversed in depth-first order. Since A12 also has no children, there are, again, no subtrees to traverse. Thus, the traversal of A1 and its subtrees is complete, and the algorithm moves on to traverse the next subtree of node A (i.e., the subtree rooted at A2), and proceeds to traverse this subtree in the same manner as the subtree rooted at A1 was traversed.

Figure 4:
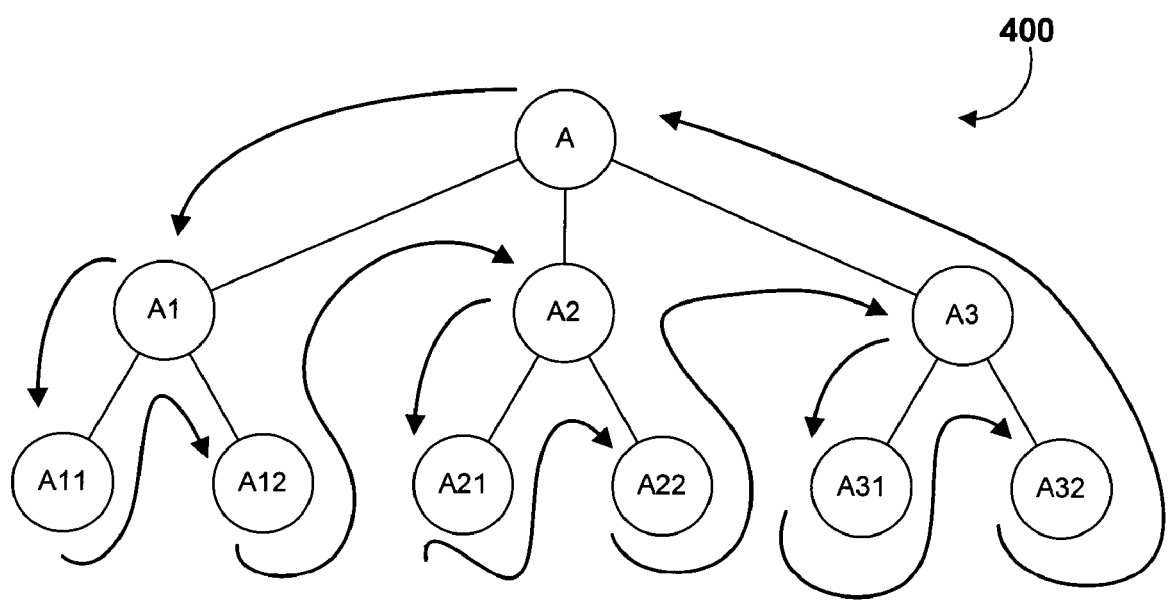
FIG. 4 is a block diagram of a tree, showing a depth-first traversal of the tree.

When a tree is traversed using the recursive algorithm described above, the result is to visit all of the nodes in tree 400 in the order shown in FIG. 4—i.e., in the order: A, A1, A11, A12, A2, A21, A22, A3, A31, A32.

Example Validation Table

As noted above, an XML message may conform to a structure or syntax specified in a schema, and yet still may contain invalid data in its substance. For example, as described above in connection with FIGS. 2 and 3, a message may contain an address, which may specify city="Redmond," state="Washington," and zip="98052." This information is syntactically valid (i.e., including a city, state, and zip code is the correct syntax for an address in the United States), and it is also substantively valid (i.e., 98052 is, in fact, the correct zip code for Redmond, Wash.). It should be noted, however, that there is no way to determine from the syntax of an address whether the address is substantively valid. For example, "Redmond, Wash. 19103" is a syntactically valid address, but not a substantively valid address, since 19103 is the zip code for Philadelphia, Penn., not Redmond, Wash. Thus, ensuring that an XML message conforms to a schema can ensure only syntactic validity, but not other types of validity. The invention provides a framework for performing arbitrary validity tests on an XML message.

Figure 5:
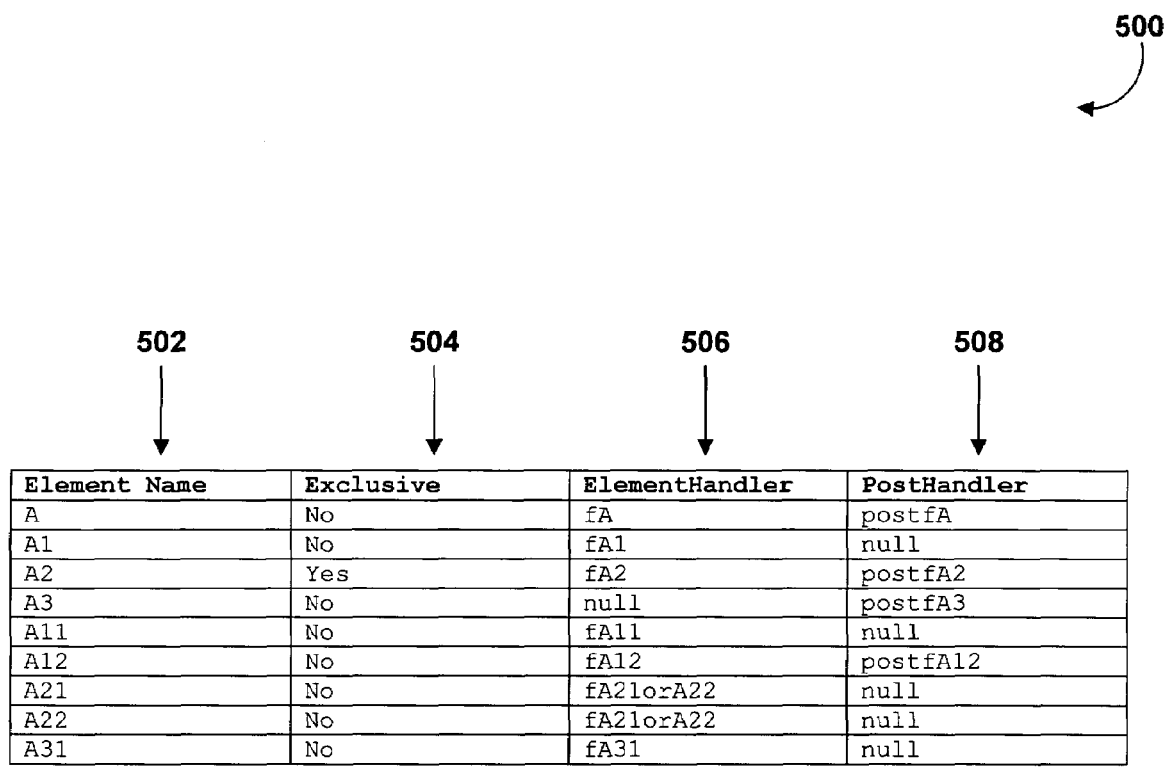
FIG. 5 is a block diagram of an example validation table in accordance with aspects of the invention.

FIG. 5 shows an exemplary validation table 500, which specifies the validation tests that are to be performed on a particular type of XML message. The elements shown in table 500 correspond to the element types of tree 400 (shown in FIG. 4)—i.e., tree 400 has elements named A, A1, A11, etc., and so does table 500. Validation table 500 comprises four columns 502, 504, 506, and 508. For a given row of table 500, the entries have the following meanings:

The entry in column 502 is the name of the element to which the row applies;
The entry in column 504 indicates whether the delegate(s) specified for the element are "exclusive." (The terms "delegate" and "exclusive" are more particularly explained below.);
The entry in column 506 is the name for the delegate (or "handler") that will be invoked when the element is encountered; and
The entry in column 508 is the delegate that will be invoked after the element, and all of its subtrees have been processed.

Thus, the first row in table 500 indicates that, for elements named "A", the delegate named "fA" is to be invoked when the element is encountered, and the delegate named "postfA" is to be invoked after all of the subtrees for the element have been validated. Additionally, this row indicates that the delegates specified in this row are not "exclusive"—i.e., they are not to exclude the use of subtree delegates.

A "delegate" is a named piece of code that performs the validation for a particular type of element. For example, a delegate for the CITYSTATEZIP element discussed in FIG. 2 could contain (or, at least, consult) tables of United States cities, states, and zip codes to determine whether the combination specified in a CITYSTATEZIP element is a correct combination. It should be understood that the invention is not limited to any particular type of validation test, and consumers of systems that incorporate the invention are free to write their own delegates and define what it means for an element to be valid. In particular, it should be observed that a delegate is not limited to considering the content of the element for which it is registered (or even of the subtrees for which it is registered), but can also consider information outside of that subtree (e.g., a delegate for the CITYSTATEZIP element could also consider the street address (element 204, shown in FIGS. 2 and 3) in order to determine whether the zip+4 value is valid). The fact that validity can be arbitrarily defined based on what delegates are written provides the flexibility to validate any type of message.

In one example, the delegate is written in a programming language such as C#, although it will be understood that a system according to the invention can be configured to use any named piece of code as a delegate.

Delegate names appear in both column 506 and column 508. The delegate named in column 506 is the delegate that will be invoked when a given element is visited in a tree traversal. The delegate named in column 508 will be invoked after all of the subtrees of the element have been traversed. Thus, the delegate named in column 508 is a "post-handler," since it is invoked after the element and all of its subtrees have been visited.

The "exclusive" property specified in column 504 specifies whether the delegates for subtrees of the current element are to be invoked. Thus, in table 500, element A2 has the exclusive property, meaning that, when an element of type A2 is encountered, the individual delegates for the elements of A2's subtrees are not invoked, because A2's delegates have "exclusive" control over A2 and all of its subtrees. Thus, even though table 500 shows delegates for elements A21 and A22, these delegates are not invoked, because A2 has the "exclusive" property, which prevents delegates from being invoked for any element in any of the subtrees of A2.

A system in accordance with the invention may contain a validation engine, which walks through an XML message (e.g., in a depth-first order traversal of the tree that the message represents), and applies delegates in accordance with the specification in a validation table. It will be appreciated that the validation engine allows validation tests to be modified or substituted without the need for access to the validation engine's source code; validation tests can be changed simply by registering or de-registering delegates from the validation table. This ability to modify validation tests without access to the underlying validation engine source code is an example of the flexibility provided by the invention.

Table 1 shows an example validation test performed on tree 400 (shown in FIG. 1) by a validation engine, using validation table 500. The column on the left shows various events in the validation process (e.g., the encountering of elements and the completion of an element's subtrees) in the order in which those events occur. The column on the right shows which delegate is called upon the happening of an event. As can be seen in Table 1, even though elements A21 and A22 have delegates registered for them, those delegates are not called by the validation engine because A21 and A22 are children of node A2, and node A2 is registered with the exclusive flag set to "yes." (If, in a different message, A21 or A22 were to appear as children of some other node which had not been marked as exclusive, then the validation engine would encounter nodes A21 or A22, and the delegate fA21 or A22 would be invoked at the time those nodes were encountered.

TABLE 1

| Element encountered by engine | Delegate called |
|---|---|
| A | fA |
| A1 | fA1 |
| A11 | fA11 |
| Subtree at A11 is done | (post-handler null, so nothing called) |
| A12 | fA12 |
| Subtree at A12 is done | postfA12 |
| Subtree at A1 is done | (post-handler null, so nothing called) |
| A2 | fA2 |
| Subtree at A2 is done (fA2 is exclusive) | postfA2 |
| A3 | (handler null, so nothing called) |
| A31 | fA31 |
| Subtree at A31 is done | (handler null, so nothing called) |
| A32 | (no registration, so nothing called) |
| Subtree at A32 is done | (no registration, so nothing called) |
| Subtree at A3 is done | postfA3 |
| Subtree at A is done | postfA |

In accordance with one feature of the invention, there may be both a global validation table and a local validation table. The architecture of the present invention allows for the possibility that fields or group of fields could be common among several different classes of messages. The settings for these common fields can be stored in a global validation table. Any settings that apply only to a particular class of message can be stored in the local validation table. In practice, the local validation table functions as a set of class-specific overrides for the global validation table. Also, in one embodiment of the invention, multiple global validation tables can be created, and a particular global table can be selected for use based on some context.

Exemplary Validation Process

As noted above, a validation engine in accordance with the invention walks through an XML message, and invokes delegates to the various elements in the message in accordance with one or more validation tables. The following is a description of the process carried out by a validation engine.

The validation engine starts with the root element of the XML message (e.g., the ADDRESS element in the example of FIGS. 2-3, or the "A" element in the example of FIG. 4). This starting element is set to be the "current" element. Then for the current element (which shall be referred to in this description as "X"), the validation engine:

Looks up the delegate in the "element handler" column for X in the local validation table. If a delegate is specified in that column in the local validation table, the engine calls the element handler.

If the local table does not specify a delegate for X in the "element handler" column, the engine looks up the delegate for X in the global table. If a handler for X is specified in the "element handler" column in the global table, then the specified delegate is invoked. If neither table specifies a delegate for the element X, then no delegate for element X is invoked.

For each of the child elements of element X, the steps described above are repeated (unless X is registered as "exclusive"). In one embodiment, those steps are implemented in a recursive functions, which may be called on the subtrees of element X.

If a post-handler delegate exists for X (either in the local or global tables), then the post-handler is called after all subtrees of X have been handled. (If a post-handler delegate exists for X in both tables, then only the delegate specified in the local table is invoked.)

Figure 6:
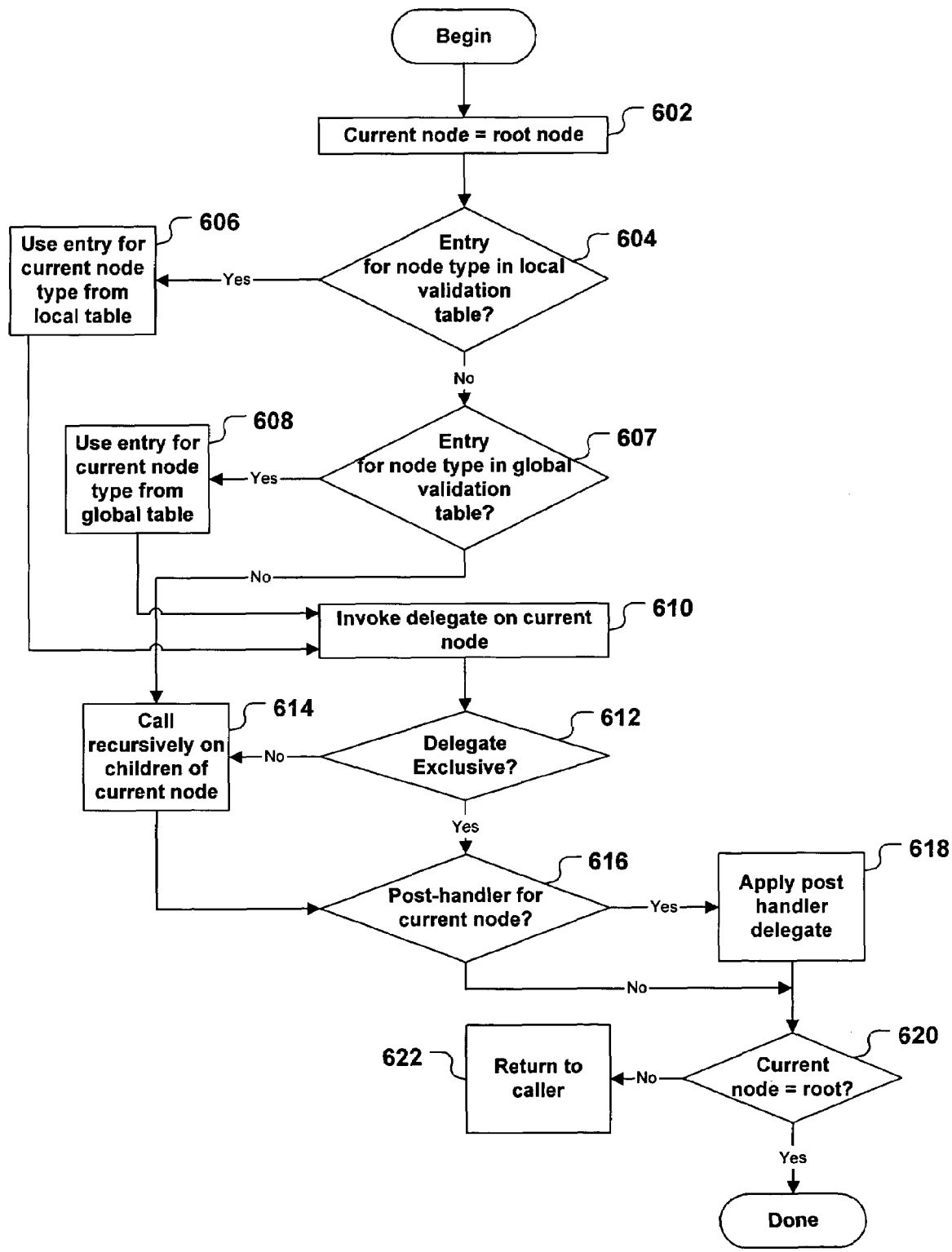
FIG. 6 is a flow diagram of an example validation process in accordance with aspects of the invention.

FIG. 6 shows a process carried out by a validation engine in the form of a flow diagram. Initially, the "current node" is defined to be the root node of a tree (602) (e.g., the root element in an XML message). The local validation table is then consulted. If there is an entry for the current node in the local validation table showing a delegate for that node type (604), then the entry from the local validation table is used (606). If there is no entry in the local validation table, then it is determined whether there is an entry in the global validation table (607). If there is an entry from the global validation table, then that entry is used (608). Assuming that some delegate has been found in either the local or global validation table, that delegate is invoked (610); otherwise, the process continues to 614 as described below.

If the entry for the current node (i.e., the entry from the local or global validation table—whichever table was, in fact, used), indicates that the entry is not "exclusive" (612), then the process of FIG. 6 is recursively called on each of the child nodes of the current nodes (614). Preferably, the process is called on these child nodes in left-to-right order. If the entry for the current node indicates that the entry is exclusive, then the process of FIG. 6 is not called on the child nodes, since the entry for the current node has exclusive control over all subtrees of the current node.

If there is a post-handler delegate for the current node (616), that post-handler is invoked (618). (The post-handler is applied either directly after the delegate invoked at 610 (in the case where the current node entry is exclusive), or after handling of the subtrees (in the case where the current node entry is not exclusive)). After the post-handler delegate is applied (or after it has been determined that there is no post-handler delegate), it is determined whether the current node is the root of the top-level tree (620). If the current node is the root of the top-level tree (e.g., node 302 in FIG. 3, or node "A" in FIG. 4), then the process terminates. Otherwise, the process returns to its caller (622) (since, if the current node is not the top level root, the process of FIG. 6 has been called recursively by a prior instances of that process).

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-readable storage medium encoded with computer-executable instructions to perform a method of validating text content structured into a plurality of elements comprised of markup and the content, which is delimited by the mark, the method comprising:
   encountering as part of a depth-first traversal order for encountering the plurality of elements, a first element of the plurality of elements;
   consulting one or more validation tables to identify, from among a plurality of validation delegates, a first delegate that corresponds to said first element, the one or more validation tables not being schema that describe valid syntax or structure of said text content, the one or more validation tables including a local validation table and a global validation table, the one or more validation tables including for each element listed in said one or more validation tables, a flag indicating whether subtrees of a given element are to be traversed;
   determining that the flag corresponding to said first element indicates that subtrees of said first element are to be traversed;
   executing said first delegate with the content of the first element to determine whether the content in the first element is valid;
   encountering as part of the depth-first traversal order for encountering the plurality of elements, a second element that is a root of a subtree of said first element;
   consulting the one or more validation tables to identify, from among the plurality of validation delegates, a second delegate; and
   executing said second delegate with the content of the second element to determine whether the content in the second element is valid,
   wherein at least one of said first delegate or said second delegate determines whether the content of the element to which it is applied is valid based on at least one non-syntactic condition of the corresponding content.

2. The computer-readable storage medium of claim 1, further comprising:
   prior to consulting said one or more validation tables, determining that at least one of the one or more validation tables contains no delegate that corresponds to said first element.

3. The computer-readable storage medium of claim 1, wherein said act of executing said first delegate is performed prior to said act of encountering said second element, and wherein the method further comprises:
   subsequent to executing said second delegate, consulting said first validation table to identify a third delegate that corresponds to said first element; and
   executing said third delegate with the content of said first element.

4. The computer-readable storage medium of claim 1, wherein a validation engine is used for validating the text content, the method further comprising:
   specifying a third delegate as an exclusive delegate whereby the exclusive delegate has exclusive control over validating a specific node and subtrees of the specific node and wherein the validation engine is inhibited from traversing the node and the subtrees of the specific node.

5. The computer-readable storage medium of claim 1, wherein the local table is consulted prior to consulting the global table.

6. The computer-readable storage medium of claim 1, wherein said method further comprises:
   determining that the flag corresponding to said second element indicates that subtrees of said second element are not to be traversed; and
   applying said second delegate to said second element without traversing subtrees of said second element.

7. The computer-readable storage medium of claim 1, wherein said first delegate and said second delegate each comprise interpretable code.

8. The computer-readable storage medium of claim 1, wherein the method further comprises:
   determining whether the text content is valid based on execution of delegates with the text content in accordance with said one or more validation tables.

9. A method of validating text content structured into a plurality of elements comprised of markup and the content, which is delimited by the markup, comprising:
   creating one or more validation delegates, each validation delegate being adapted to determine whether a particular type of element of the text is valid, the one or more validation delegates including an exclusive delegate having exclusive control over validating a specific node and subtrees of the specific node;
   creating a local validation table that specifies validation delegates specific to a particular class of text; and
   applying a validation engine to the text, wherein the validation engine, for each of the elements, consults said local validation table to identify, from among the validation delegates specified by the table, a validation delegate to be executed with the element, and executes the identified validation delegate with the content of the element,
   wherein at least one of the validation delegates determines whether the content of the element with which it is executed is valid based on at least one non-syntactic condition of the content of the element.

10. The method of claim 9, further comprising:
    creating a global validation table that specifies validation delegates that apply to a broad category of text classes, wherein the validation engine consults the local validation table and, if there is an entry for a given type of element, executes the validation delegate specified by the local validation table, and otherwise executes the validation delegate specified by the global validation table.

11. The method of claim 9, wherein the local validation table specifies first and second validation delegates for each type of element of the text content, and wherein the validation engine executes the first validation delegate to the element when the element is encountered, and executes the second validation delegate to the element after the first validation delegate, and the validation delegates applicable to any subtrees of the element, have been executed.

12. The method of claim 9, wherein said text content is organized in the form of a tree, each element of the text content corresponding to a node in the tree.

13. The method of claim 9, wherein said local validation table specifies, for each type of element in the text content, a flag indicating whether the validation delegates for subtrees of said type of element are to be applied to said subtrees.

14. The method of claim 9, wherein each of said validation delegates comprises interpretable code.

15. The method of claim 9, wherein at least one of the validation delegates comprises a null delegate.

16. A computer-readable storage medium having stored thereon a data structure comprising:
a plurality of element names, each element name identifying an element within text content that is structured into a plurality of elements comprised of markup and the content, which is delimited by the markup; and
for each element name, a corresponding name of a first delegate, each first delegate comprising code that determines whether the element that corresponds to the element name is valid, wherein the first delegate determines whether the element that it is called upon to validate is valid based on at least one non-syntactic condition of the content that corresponds to that element;
for each element name, a corresponding name of a second delegate, each second delegate comprising code that executes after the first delegate corresponding to the element name, and any delegates corresponding to a subtree of the element that corresponds to the element name, have been run; and
for each element name, a flag indicating whether the first delegate corresponding to the element name is to be applied exclusively to the element corresponding to the element name and to any subtree thereof.

17. A system for validating text content that comprises a plurality of elements that comprise markup and content, the text content being organized in the form of a tree, the system comprising:
a computer-readable storage medium containing a first validation table indicating a plurality of delegates, each delegate corresponding to a name of an element in the tree, wherein at least one of the plurality of delegates is an exclusive delegate having exclusive control over validating a specific node and subtrees of the specific node; and
the computer-readable storage medium further containing a validation engine configured to traverse the tree and, for each element encountered in the traversal of the tree, consult the first validation table to identify one of the plurality of delegates that is to be executed with the encountered element, and to execute the identified delegate by invoking the delegate,
wherein at least one of the plurality of delegates determines whether the element with which it is executed is valid based on at least one non-syntactic condition.

18. The system of claim 17, further comprising:
a second validation table contained in the computer-readable storage medium, the second validation table indicating a plurality of delegates, each delegate corresponding to a name of an element in the tree,
wherein the validation engine is further configured to, for each element encountered in the traversal of the tree, consult the second validation table to determine whether there is an entry for the encountered element, use the entry if the entry is present, and consult the first validation table if the second validation table contains no entry corresponding to the encountered element.

19. The system of claim 17, wherein the first validation table identifies a post-handling delegate for at least some of the elements in the tree, the post-handling delegate being invoked after the delegate for the element, and the delegates for the element's subtrees, have been invoked.

20. The system of claim 17, wherein the first validation table indicates, for a first one of the encountered elements, that the delegate identified by the first validation table for said first one of the encountered elements is to be applied to a subtree rooted at said first one of the encountered elements, and wherein the validation delegate identified for said first one of the elements by said first validation table is given exclusive control over said first one of the elements and any subtree of said first one of the elements.

21. The system of claim 17, wherein each of the delegates comprises interpretable code.

22. A computer readable storage medium storing a validation engine that performs a process, the process performed by the validation engine comprising:
traversing a structured document to visit elements of the structured document, the elements comprising markup and content that is delimited by the markup, where the markup conforms to a markup language, and where the elements are of various element types; and
checking the types of the respective elements when the validation engine visits the elements for validation and using the types to determine which executable validation delegates to execute to validate the contents of the respective elements, where the determining is performed according to mapping information that maps the executable validation delegates to corresponding element types, and where the mapping information can be modified to cause the same validation engine, without modification, to modify which executable validation delegates the validation engine selects for which corresponding element types, the determining further comprising examination of the condition of a flag contained in the mapping information for indicating whether the subtrees of a given element are to be traversed.

23. A computer readable storage medium storing a validation engine according to claim 22, wherein the executable validation delegates validate that the content satisfies non-syntactic conditions.

24. A computer readable storage medium storing a validation engine according to claim 22, wherein the traversing is recursive and the content of at least one element is determined to be valid or not based on a delegate selected for the at least one element and based on another delegate selected for an element in a sub-tree of the at least one element.

* * * * *